United States Patent [19]

Scragg

[11] Patent Number: 5,705,056
[45] Date of Patent: Jan. 6, 1998

[54] SEPARATOR FOR SEPARATING A HEAVIER LIQUID FROM A LIGHTER LIQUID

[76] Inventor: John Edgar Scragg, P O Box 22195, Glenashley, 4022, South Africa

[21] Appl. No.: 541,015

[22] Filed: Oct. 11, 1995

[30] Foreign Application Priority Data

Oct. 13, 1994 [ZA] South Africa .................. 94/8020

[51] Int. Cl.$^6$ ................ B01D 33/00; B01D 12/00
[52] U.S. Cl. ............... 210/123; 210/98; 210/121; 210/134; 210/242.1; 210/513; 210/515; 137/192
[58] Field of Search .............. 210/98, 121, 123, 210/112, 114, 115, 117, 167, 513, 515, 519, 522, 540, 134, 242.1, 242.2, 799; 137/38, 173, 192, 398, 399

[56] References Cited

U.S. PATENT DOCUMENTS

| | | | |
|---|---|---|---|
| 3,568,835 | 3/1971 | Hansen | 210/115 |
| 3,868,321 | 2/1975 | Gough | 210/115 |
| 3,948,768 | 4/1976 | Chapman | 210/799 |
| 4,528,094 | 7/1985 | Scragg | 210/114 |
| 4,799,504 | 1/1989 | Scragg et al. | 137/38 |

*Primary Examiner*—Ana Fortuna
*Attorney, Agent, or Firm*—Fitch, Even, Tabin & Flannery

[57] ABSTRACT

A separator (10) for separating a heavier liquid from a lighter liquid is disclosed which is intended to operate between a fuel tank (12) and a fuel pump connected to the fuel outlet (24) of the separator (10). The separator includes a float (30) which is light enough to float on the heavier liquid and which is heavy enough to sink in the lighter liquid. The float controls opening and closing of a valve (44, 46) through which heavier liquid is disclosed from the separator. As heavier liquid accumulates, the float lifts to open the valve (44, 46). A plate (34) subjected to a force caused by fuel flowing into the separator through the inlet (16) prevents the float opening the valve whilst the separator is in subatmospheric pressure. The plate can be replaced by a diaphragm which is subject on one side to atmospheric pressure and on the other side to the pressure in the separator.

7 Claims, 1 Drawing Sheet

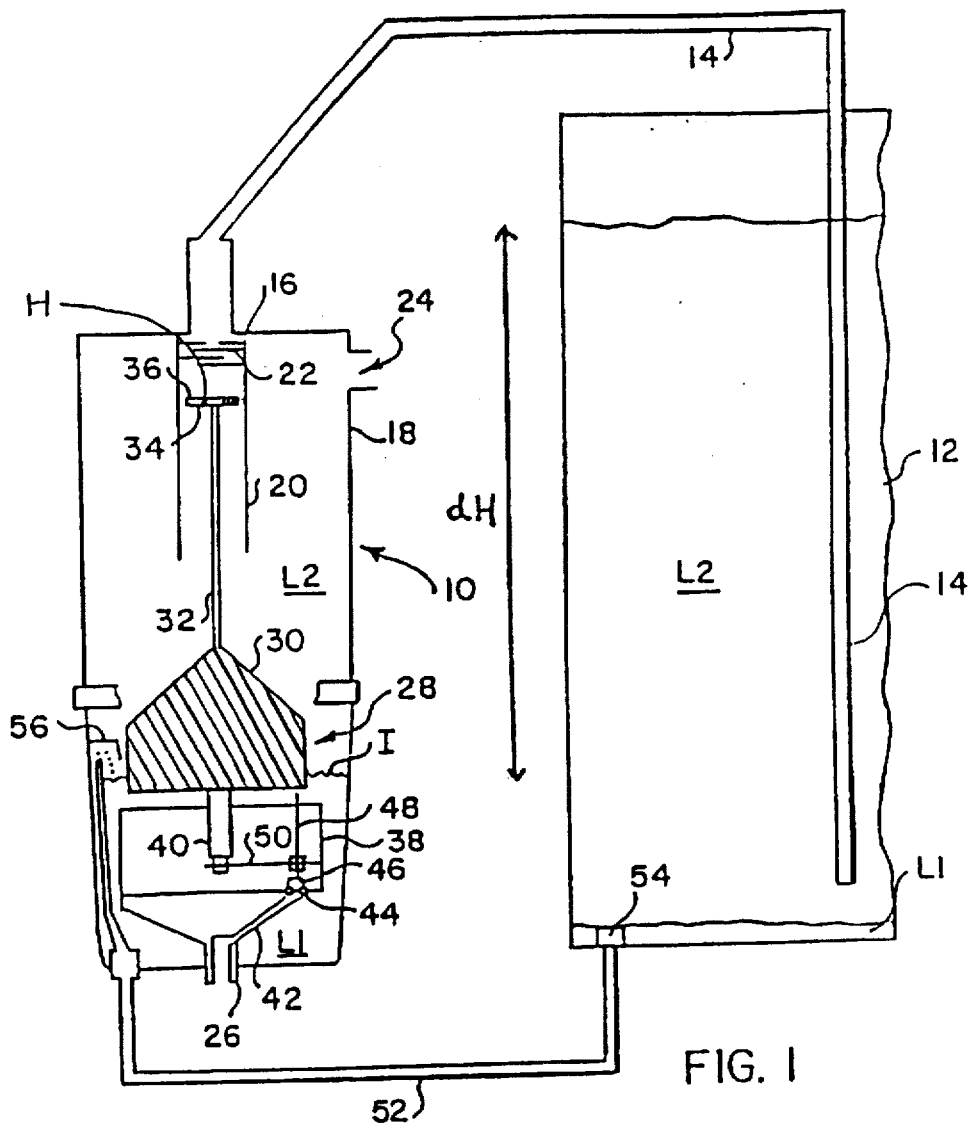
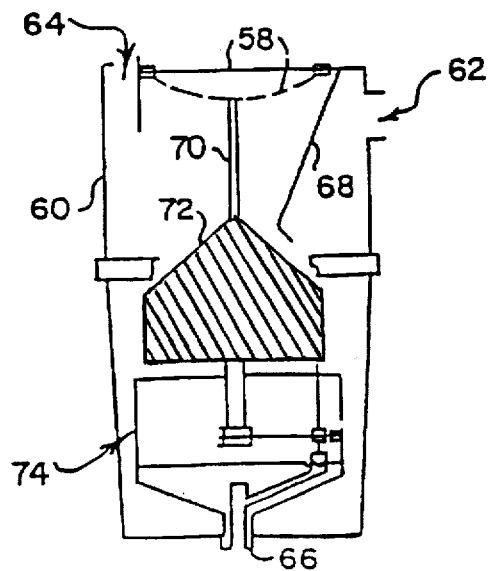
FIG. 1
FIG. 2

SEPARATOR FOR SEPARATING A HEAVIER LIQUID FROM A LIGHTER LIQUID

FIELD OF THE INVENTION

This invention relates to separators for separating a heavier liquid from a lighter liquid.

BACKGROUND TO THE INVENTION

The problem of water contamination of diesel fuel is well known. Diesel engines thus require a separator for removing water from diesel fuel that is being pumped to the engine.

Separators which are intended to remove water from diesel and other fuels rely on the difference between the specific gravity of the water and the specific gravity of the fuel for the purposes of separation. The water is allowed to collect in the bottom of a receptacle and is drained-off periodically. In most constructions of which Applicant is aware, the water is drained off manually. The separator includes a transparent bowl and the engine operator is able, by visual inspection, to see how much water has accumulated. By opening a tap he can permit the accumulated water to run out. The tap is shut just before fuel starts to drain out. Buzzers and warning lights are sometimes used to warn the engine operator of a water build-up in the separator.

Applicant is also aware of separators which include means for automatically discharging accumulated water. Such separators must be fitted on the pressure side of a lift pump. Many engine layouts include such a pump which draws fuel from the tank and feeds it to the fuel injection system. Once a sufficient quantity of water has accumulated, a float lifts a valve closure member off a seat and opens a drain outlet. If the fuel feed pump is running at the time, then the pressure in the separator assists in discharging the accumulated water. If the pump is not running then water merely flows out under the effects of gravity.

The separator with automatic water discharge of which Applicant is aware cannot be used on the suction side of the pump. This is because, if the drain outlet opens whilst the pump is running, water will not be discharged but air will be drawn in. Air, and probably also entrained water, will consequently reach the engine, possibly causing damage but certainly causing it to run unevenly or stall.

In layouts with a lift pump, it is possible to use manually drained separators on the pressure side or suction side of the pump. In other layouts there are no lift pumps, and hence no pressure side at which a separator can be fitted.

Even when a separator can be fitted on the pressure side, and hence have automatic water discharge, there is a problem in that if the fuel has water in it, the mixture is emulsified in the pump. When the emulsion subsequently passes through the separator, water from fuel separation is less efficient because of the physical state of the liquids.

For all these reasons separators fitted on the suction side of the pump are most common and can be fitted more readily. As explained above, known suction side separators cannot include automatic discharge of accumulated water. A separator capable of operating on the suction side of the fuel pump, and having means for automatically dumping water that has accumulated, has a number of advantages over a separator without such a facility. One such advantage is that, by dumping water automatically, it relieves the operator of the engine of all responsibility. If he forgets to drain the known separators, water can be carried over to the engine. A unit that drains automatically prevents this happening even if the driver is neglectful. Furthemore, separation occurs before the lift pump (if one is provided) and fuel/water emulsification at the pump is avoided.

OBJECT OF THE INVENTION

The main object of the present invention is to provide a separator for separating a heavier liquid from a lighter liquid, which separator operates at the sub-atmospheric pressure which exists on the vacuum side of a pump and which includes means for automatically dumping accumulated heavier liquid.

BRIEF DESCRIPTION OF THE INVENTION

According to one aspect of the present invention there is provided a separator for separating a heavier liquid from a lighter liquid that floats on the heavier liquid, the separator comprising a casing having an inlet for a mixture of lighter and heavier liquids, a first outlet for the lighter liquid and a second outlet for the heavier liquid, the second outlet being at the lower end of said casing so that the heavier liquid which has accumulated in the lower part of said casing can be discharged there through, a float structure including a float which floats on the heavier liquid and sinks in the lighter liquid, the float structure further including closure means which shuts-off said second outlet until the float is lifted by an accumulation of heavier liquid in said casing, and means for forcing said closure means to the position in which it closes-off said outlet for said heavier fluid whilst the pressure in the casing is below atmospheric.

In one form of the invention there is an element forming part of said float structure, the element including a surface positioned so that liquid flowing through the separator impinges on it and exerts a force which opposes lifting of said float under the influence of an accumulation of heavier liquid and thus holds said closure means in the position in which it closes-off said second outlet. Preferably said element is in a tube with said surface extending transversely to the axis of the tube, the tube forming part of the flow path through the separator, said surface being smaller in area than said tube so that liquid can pass through the tube by flowing around the periphery of the element. In the preferred form said tube forms the inlet to said casing.

In a further form said float structure includes a member which is connected to said float so that it moves therewith and a diaphragm which is subject on one side thereof to atmospheric pressure and on the other side thereof to the pressure in said casing, the diaphragm, when the pressure in said casing is lower than atmospheric, holding said member and said float in a position in which said closure means closes off said outlet for heavier liquid.

According to a further aspect of the present invention there is provided, in combination, a separator as defined above and a storage tank which contains a heavier liquid at the bottom and lighter liquid floating on the heavier liquid, there being a main flow line from the tank to the inlet of the separator and a subsidiary flow line from the bottom of said tank to the casing of the separator so that, when the pressure in the casing of the separator is below atmospheric, liquid is drawn from the bottom of the tank to the separator along said subsidiary flow line thereby preferentially drawing heavier liquid from the tank to the separator.

BRIEF DESCRIPTION OF THE DRAWINGS

For a better understanding of the present invention, and to show how the same may be carried into effect, reference will now be made, by way of example to the accompanying drawings in which:

FIG. 1 illustrates a separator and storage tank combination; and

FIG. 2 illustrates a further form of separator.

DETAILED DESCRIPTION OF THE DRAWINGS

Referring firstly to FIG. 1, the separator is designated 10 and the storage tank is designated 12. The separator and tank are connected by a main flow line in the form of a pipe 14 the entrance to which is close to the bottom of the tank 12 and the exit from which is at the inlet 16 to the casing 18 of the separator 10.

The inlet 16 of the separator 10 comprises a tube 20 which protrudes into the interior of the casing 18. Within the tube 20 there is a baffle structure 22 comprising a staggered series of plates. The casing 18 has an outlet 24 close to the upper end thereof, this being an outlet for lighter liquid, and an outlet 26 at the lower end thereof, this being an outlet for heavier liquid. A pump (not shown) has its suction side connected to the outlet 24. It will be understood that some pumps (such as diaphragm pumps) cause pulsating flow. The function of the baffle is to smooth flow through the tube 20.

Reference numeral 28 designates a float structure which includes a float 30 which floats on the heavier liquid (designated L1) but sinks in the lighter liquid (designated L2). It will be noted that the heavier liquid L1 accumulates at the lower end of the casing 18 and the lighter liquid L2 floats on it. The float 30 is connected by a member 32 to an element 34 which is in the tube 20. The element 34 has a surface 36 which faces the baffle structure 22. Liquid flowing into the casing 18 thus impinges on the surface 36 and pushes the element 34 down. Smooth flow through the tube 20 is necessary to prevent the element 34 being oscillated by the flowing liquid. The element 34 is of smaller diameter than the tube 20 so that liquid can flow around the periphery of the element 34. Additionally, the element 34 can have holes in it to permit liquid to flow through the element 34. If holes are provided the element 34 can be a fairly close fit in the tube 20.

Within the casing 18 there is a sub-housing 38. A guide rod 40 extends down from the float 30 into the sub-housing 38 and ensures that the float 30 moves along a vertical line.

The outlet 26 communicates by way of a passage 42 with the interior of the sub-housing 38. A valve seat 44 encircles the entrance to the passage 42 and a closure means in the form of a valve closure element 46 co-operates with the seat 44. A pin 48 is fixed to the valve closure element 46 and extends upwardly through the top wall of the sub-housing 38. The guide rod 40 and the pin 48 are connected to a cross member 50. More specifically the member 50 is connected to the rod 40 so that its left hand end (FIG. 1) lifts and drops with the rod 40. Some sliding action is permitted between the rod 40 and the member 50 so that the rod 40 is not pulled off a vertical line by the member 50 when it it pivots. At the end thereof remote from the rod 40 the member 50 is pivotally mounted on the sub-housing 38.

The member 50 passes through a slightly oversized transverse hole in the pin 48. The member 50 thus displaces the pin 48 vertically as it lifts and drops whilst the slight freedom of movement of the pin 50 in the hole of the pin 48 prevents skrewing of the pin 48 off its vertical line by the pivoting member 50. The member 50 provides a mechanical advantage so that the pin 48 and member 46 have a force exerted on them which is sufficient to lift the member 46 clear of the seat 44 as the valve opens and to hold the member 46 against the seat whilst the valve is closed.

A subsidiary flow line in the form of a pipe 52 leads from the bottom of the tank 12 to the bottom of the separator 10.

It is possible for the pipe 52 to be open at all times or alternatively there can be a valve 54 which can either be opened manually or can be opened automatically when the level of heavy liquid that has accumulated in the tank 12 exceeds a predetermined level.

The exit from the pipe 52 is above the level of the interface I between the heavy liquid L1 and the lighter liquid L2 and is below a baffle 56.

The tank 12 will normally contain fuel and it is well known that fuel becomes contaminated with water. Because the specific gravity of water is greater than that of the fuel the two liquids tend to separate and the fuel tends to float on the water. The outlet 24 is connected to a fuel pump (not shown) which feeds fuel to the engine which is to use the fuel stored in the tank 12.

On the assumption that the fuel pump is switched off, the pressure in the casing 18 is atmospheric or above depending on the difference between the level in the tank and the level of the interface I. If sufficient water has collected in the lower part of the casing 18, the float 30 lifts carrying the rod 40 and pin 48 up with it. The valve closure element 46 thus lifts off the seat 44 and water flows through the outlet 26 until such time as the float 30 drops to a position in which the element 46 bears down on the valve seat 44.

When the fuel pump is switched on, fuel is drawn through the pipe 14, inlet 16, tube 20, interior of the casing 18 and thence to the outlet 24. Because the separator 10 is connected on the suction side of the pump, the pressure within the casing 18 drops to sub-atmospheric. Lifting of the valve closure element 46 in these circumstances would result in air being drawn into the outlet 26 and being fed to the engine resulting in fuel starvation and possible stalling. The element 46 cannot, however, lift as flowing fuel impinges on the top surface 36 of the element 34 and pushes it, the member 32 and the float 30 down so that the element 46 is held against the seat 44. Whilst the engine is running, water thus accumulates in the lower part of the casing 18. There is thus an upward force on the float 30 but this is exceeded by the downward force exerted on the element 34. The float 30 thus remains in its lowermost position and the outlet 26 remains closed. As soon as the engine is switched-off, the downward force on the element 34 ceases and the float 30 moves upwardly to discharge water from the casing 18.

The capacity of the casing 18 is such that, during normal operation, the quantity of water that collects will never be such that it will be carried out of the outlet 24. As engines are generally run intermittently, discharge of water will invariably occur before there is any danger of it being carried over into the fuel pump and hence to the engine.

The annular gaps between the top wall of the sub-housing 38 on the one hand and the guide rod 40 and pin 48 on the other hand are such that water can enter the sub-housing 38 but solid particles in the fuel are prevented from reaching the interior of the sub-housing and hence the valve seat 44. Such particles, if they lodge between the valve seat 44 and the valve closure element 46, can prevent the outlet 26 being closed off properly.

Turning now to FIG. 2, this shows a separator which functions in the same way as the separator 10 but includes a diaphragm 58 the upper surface of which is subject to atmospheric pressure and the lower surface of which is subject to the pressure in the separator casing 60. It will be noted that the inlet 62 to the casing 60 is in a side wall, the fuel outlet 64 is in the top wall and the water drain outlet 66 is at the bottom. There is a deflector plate 68 across the inlet 62, the plate 68 deflecting incoming liquid down towards the bottom of the casing 60.

A member 70, equivalent to the member 32 and connected to a float 72, bears on the underside of the diaphragm 58 but is not connected thereto. The remainder of the structure within the sub-housing 74 is the same as that described above.

When the fuel pump is running, the pressure within the casing 60 is below atmospheric and atmospheric pressure acting on the top surface of the diaphragm 58 holds the member 70 and hence the float 72 in their lowermost positions. The valve closure element thus remains on the valve seat. When the engine is switched off the pressure within the casing 60 rises to atmospheric and the diaphragm 58 flattens. The downward force that was exerted on the member 70 and float 72 is thus removed and, if water has collected in the lower part of the casing 60 in sufficient volume to lift the float 72, then the float 72 at this time lifts and permits water to flow out of the separator. It will be understood that once water has been discharged the float moves down again to close off the outlet. The fact that the member 70 and the diaphragm 58 are not connected means that the diaphragm does not restrict this downward movement. The function of the diaphragm 58, therefore, is simply to ensure that, when there is a sub-atmospheric pressure in the casing 60, the float cannot lift.

I claim:

1. A separator for separating a heavier liquid from a lighter liquid that floats on the heavier liquid, the separator comprising a casing having an inlet for a mixture of lighter and heavier liquids, a first outlet for the lighter liquid the first outlet in use of the separator being connected to a suction pump for selectively changing the conditions in the casing by reducing pressure within the casing below atmospheric so that lighter liquid is drawn from the casing through the first outlet and a second outlet for the heavier liquid, the second outlet being at a lower end of said casing so that the heavier liquid which has accumulated in the lower end of said casing can be discharged there through, a float structure including a float which floats on the heaver liquid and sinks in the lighter liquid, the float structure further including closure means which has a first position in which it shuts-off said second outlet and a second position in which said second outlet is open and heavier liquid flows from the casing through the second outlet, the float when lifted by an accumulation of heavier liquid in said casing displacing the closure means from its first position to its second position, and forcing means responsive to the change in conditions that occurs in the casing when suction is applied to said first outlet and which exerts a force on said closure means during that period during which lighter liquid is being drawn from said casing through said first outlet, said force holding said closure means in said first position while the pressure in the casing is below atmospheric.

2. A separator as claimed in claim 1, wherein said forcing means comprises an element forming part of said float structure, the element including a surface positioned so that liquid flowing through the separator impinges on it and exerts a force which opposes lifting of said float under the influence of an accumulation of heavier liquid and thus holds said closure means in said first position.

3. A separator as claimed in claim 2, wherein said element is positioned in a tube with said surface extending transversely to the axis of the tube, the tube forming part of a flow path through the separator, said surface being smaller in area than said tube so that said element can move freely in said tube.

4. A separator as claimed in claim 3, wherein said element has holes in it through which liquid can flow.

5. A separator as claimed in claim 3, wherein said tube forms the inlet to said casing.

6. A separator as claimed in claim 1, wherein said float structure includes a member which is connected to said float so that it moves therewith and is further contacted by a diaphragm of the casing which is subject on one side thereof to atmospheric pressure and on the other side thereof to the pressure in said casing, the diaphragm, when the pressure in said casing is lower than atmospheric, holds said member and said float in a position which said closure means is in said first position.

7. In combination, a separator as claimed in claim 1 and a storage tank which contains a heavier liquid at the bottom and lighter liquid floating on the heavier liquid, there being a main flow line from the tank to the inlet of the separator and a subsidiary flow line from the bottom of said tank to the casing of the separator so that, when the pressure in the casing of the separator is below atmospheric, liquid is drawn from the bottom of the tank to the separator along said subsidiary flow line thereby drawing heavier liquid from the tank to the separator.

\* \* \* \* \*